United States Patent [19]
Suzuki

[11] Patent Number: 5,907,256
[45] Date of Patent: May 25, 1999

[54] INTERNAL CLOCK GENERATOR FOR SELF-TIMED CIRCUIT WITH REDUCED DIFFERENCE BETWEEN A CYCLE OF A CLOCK AND DELAY TIME OF A COMBINATIONAL CIRCUIT

[75] Inventor: Hiroaki Suzuki, Tokyo, Japan

[73] Assignee: Mitsubishi Denki Kabushiki Kaisha, Tokyo, Japan

[21] Appl. No.: 08/795,351

[22] Filed: Feb. 4, 1997

[30] Foreign Application Priority Data

Sep. 11, 1996 [JP] Japan .................................. 8-240654

[51] Int. Cl.⁶ ...................................................... H03K 3/00
[52] U.S. Cl. ............................................ 327/291; 327/294
[58] Field of Search ..................................... 327/291–295, 327/297, 261, 284, 141, 142, 158, 172–176, 178, 161

[56] References Cited

U.S. PATENT DOCUMENTS

| | | | |
|---|---|---|---|
| 4,688,947 | 8/1987 | Blaes et al. | 368/120 |
| 5,120,988 | 6/1992 | Matsuki | 327/291 |
| 5,553,276 | 9/1996 | Dean | 395/550 |
| 5,646,554 | 7/1997 | Kim et al. | 326/93 |

FOREIGN PATENT DOCUMENTS 61-45629  3/1986  Japan .

OTHER PUBLICATIONS

Technical Report of ICICE, ICD93–84, DSP93–45 (Sep. 1993); "Design of a Free–Running Multiplier", Yano et al. pp. 7–14.

*Primary Examiner*—My-Trang Nu Ton
*Attorney, Agent, or Firm*—Burns, Doane, Swecker & Mathis, LLP

[57] ABSTRACT

An internal clock generator is provided in which a clock having the smaller difference between the cycle of the clock and the delay time of a combinational circuit is generated. The combinational circuit included in a circuit to which the clock is supplied includes five signal processing portions which can become critical paths. Dummy signal processing portions are circuits corresponding to the signal processing portions, respectively. A clock which includes, in a cycle, the maximum value of the delays between the inputs and outputs of the dummy signal processing portions is generated. Consequently, if the critical path of a circuit for inputting the clock is changed and the delay time of the combinational circuit is increased or decreased, the cycle of the clock is increased or decreased accordingly. As a result, the difference between the cycle of the clock and the delay time of the combinational circuit is reduced so that the operation of the circuit is performed at higher speed.

7 Claims, 8 Drawing Sheets

INTERNAL CLOCK GENERATOR FOR SELF-TIMED CIRCUIT WITH REDUCED DIFFERENCE BETWEEN A CYCLE OF A CLOCK AND DELAY TIME OF A COMBINATIONAL CIRCUIT

BACKGROUND OF THE INVENTION

1. Field of the Invention

The present invention relates to an internal clock generator for generating a clock, and more particularly to an internal clock generator which is utilized for an apparatus using a method for processing a signal based on a clock generated by itself (hereinafter referred to as a "self-timed method").

2. Description of the Background Art

An example of a self-timed apparatus is an information processor such as an arithmetic circuit. The self-timed apparatus comprises a clock generator for generating an internal clock (an internal clock generator) and a self-timed apparatus body for processing a signal based on the clock.

Two cases are caused by changing various conditions, for example, process conditions, a variation in manufacture, the ambient environment such as an ambient temperature, the transition of an input signal and the like. In a first case, the cycle of the generated clock fluctuates. In a second case, on a path provided between first and second specific nodes in the self-timed apparatus body, a delay time (processing time) required to input a signal to the first node, to process the signal on the path, and to output the processed signal to the second node fluctuates. The transition of the input signal means that the input signal is changed from the "H" level to the "L" level, and from the "L" level to the "H" level.

When at least one of the two cases is caused, the self-timed apparatus sometimes malfunctions. For example, in the case where the self-timed apparatus body has a structure in which a signal is fetched at the effective edge of the clock on the first node, the fetched signal is processed and the processed signal is fetched at the next effective edge on the second node, the malfunction of the self-timed apparatus is sometimes caused. In the case where the signal is processed synchronously with the clock, it is necessary to process the signal between the effective edges. If the signal cannot be processed between the effective edges, that is, a period for the effective edges is shorter than the processing time, the self-timed apparatus malfunctions.

Accordingly, it is necessary to design the self-timed apparatus to always make the period for the effective edges longer than the processing time such that a malfunction is not caused even if the conditions are changed.

However, it is insufficient that the difference between the period for the effective edges and the processing time (hereinafter referred to as an "operating margin") is simply increased so as to make the period for the effective edges longer than the processing time. As the operating margin is increased, the time for processing the signal by the self-timed apparatus becomes longer. Consequently, as the operating margin is smaller, the time for processing the signal by the self-timed apparatus is shortened.

As described above, it is necessary to always make the period for the effective edges longer than the processing time and to reduce the operating margin as much as possible in order to obtain a self-timed apparatus which does not malfunction due to the period of the clock and can process the signal in a short time.

However, it is difficult to decide the cycle of the clock such that the period for the effective edges is always longer than the processing time and the operating margin is always reduced as much as possible. The reason is that it is necessary to allow for a fluctuation in the cycle of the clock in the first case and a fluctuation in the processing time in the second case.

A method for diminishing the influence of conditions has been disclosed in "Design of a Free-Running Multiplier", Chapter V, (Technical Report of Institute of Electronics, Information and Communication Engineers of Japan (IEICEJ) "Integrated Circuit" ICD 93-83 to 93, p 7 to 14 by Mr. Yano). This method uses a part of a self-timed apparatus body for a delay element utilized to decide the cycle of a clock which is built in a clock generator. According to this method, it is pointed out that problems are caused in three cases, that is, a case (1) where a path is changed by an input, a case (2) where a circuit is complicated, and a case (3) where a path having a maximum processing time is changed on the ambient environment conditions. The case (1) includes a case (4) where the processing time is varied depending on the transition of an input signal.

Figure 19:
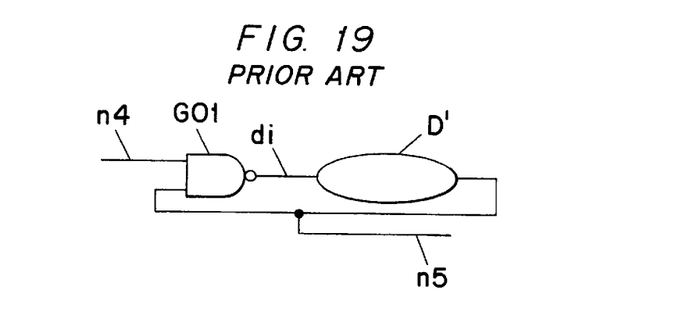
FIG. 19 is a block diagram showing the structure of an internal clock generator according to the prior art.
Figure 20:
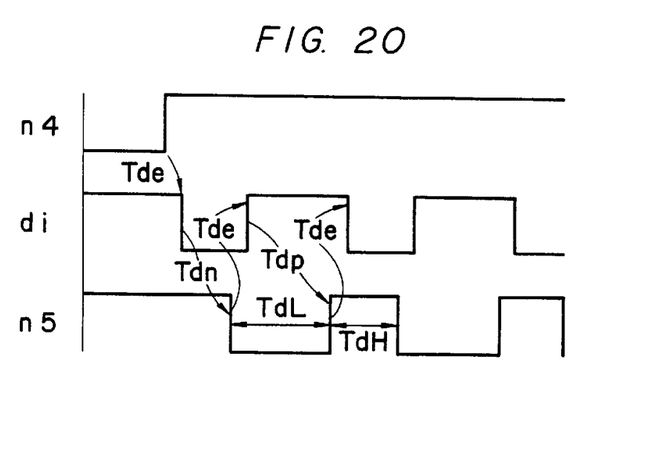
FIG. 20 is a timing chart for each signal on nodes n4, di and do.

The case (4) will be described below in detail. FIG. 19 is a block diagram showing the structure of a clock generator according to the prior art. FIG. 20 is a timing chart for each signal on nodes n4, di and n5 shown in FIG. 19. A clock control circuit G01 has the same delay time in the cases where an input signal is changed from the "H" level to the "L" level, and from the "L" level to the "H" level. The clock control circuit G01 has a delay time Tde. First of all, an enable signal on the node n4 is changed from the "L" level to the "H" level. Then, a signal on the node di is changed from the "H" level to the "L" level after the delay time Tde of the clock control circuit G01. Thereafter, a signal on the node n5 is changed from the "H" level to the "L" level after a delay time Tdn of a delay circuit D'. Subsequently, the signal on the node di is changed from the "L" level to the "H" level after the delay time Tde of the clock control circuit G01. Then, the signal on the node n5 is changed from the "L" level to the "H" level after a delay time Tdp of the delay circuit D'. Thereafter, the signal on the node di is changed from the "H" level to the "L" level again after the delay time Tde of the clock control circuit G01. By repeating the above-mentioned operation, an internal clock is generated on the node n5.

A time width TdL for a period having the "L" level of the clock on the node n5 (hereinafter referred to as a "Low period") is the sum of the delay times Tdp and Tde. A time width TdH for a period having the "H" level of the clock on the node n5 (hereinafter referred to as a "High period") is the sum of the delay times Tdn and Tde. Accordingly, the duty ratio of the clock (the delay time TdH: the delay time TdL) depends on the difference between the delay times Tdn and Tdp. If the delay time TdL is not equal to the delay time TdH, the duty ratio (TdH/TdL) is not 50%.

It is supposed that the duty ratio is not 50% and both edges are effective ones. As an example of this case, the delay time TdL is longer than the delay time TdH. In this case, short and long intervals are repeated so that the effective edges are produced. Accordingly, in the case where the self-timed apparatus body processes a signal based on the timings of both edges of the clock, the signal can be processed between the effective edges before and after the delay time TdL but cannot be processed between the effective edges before and after the delay time TdH in some cases. In these cases, the self-timed apparatus malfunctions. In order not to cause such a malfunction, a delay element which generates a delay of |Tdn−Tdp| is inserted immediately after the delay circuit D', for example. Consequently, the time width between the effective edges having the short interval becomes equal to the delay time TdL. Thus, the malfunction can be eliminated. However, the time width between the effective edges having the long interval is further increased by the delay element, that is, the operating margin is increased so that the time for processing the signal by the self-timed apparatus becomes longer.

The case (3) will be described below in detail. In the case (3), a phenomenon is simpler than in the case (4). However, a bad effect is produced even in the case where it is not necessary to set the duty ratio to 50%. Therefore, the problem becomes serious. Only paths (critical paths) D1, D2, D3, D4 and D5 have the maximum processing times produced on the different ambient environment conditions, respectively. The delay time of the delay circuit D' shown in FIG. 19 is set equal to the processing time of the path D1. If the ambient environment conditions correspond to the path D1, there is no problem. However, if the ambient environment conditions correspond to the paths D2 to D5, a signal cannot be processed between the effective edges in some cases. In these cases, the self-timed apparatus malfunctions. Accordingly, a delay element which produces a delay having the greatest value of |Td1−Td2|, |Td1−Td3|, |Td1−Td4| and |Td1 −Td5| is inserted immediately after the delay circuit D', for example. Consequently, the time width between the effective edges becomes longer than the processing time so that a malfunction is eliminated. However, in the case where the ambient environment conditions correspond to the path D1, the operating margin is increased. Consequently, the time for processing the signal by the self-timed apparatus is increased.

SUMMARY OF THE INVENTION

A first aspect of the present invention is directed to an internal clock generator for generating an internal clock to be supplied to a self-timed circuit, comprising a dummy signal processing portion formed in relation to a path composed of a combinational circuit which processes a signal to be processed in the self-timed circuit, and clock generating means for generating the internal clock including, in a cycle, a delay time produced in the dummy signal processing portion.

A second aspect of the present invention is directed to the internal clock generator, wherein a plurality of paths are composed of the combinational circuit, a plurality of dummy signal processing portions correspond to the paths, and the clock generating means includes, in the cycle, the longest delay time produced in the dummy signal processing portions.

A third aspect of the present invention is directed to the internal clock generator, wherein two dummy signal processing portions are provided on the path, one of the two dummy signal processing portions includes a first inverter connected to an input, the other dummy signal processing portion includes a second inverter connected to an output, and the clock generating means includes, in the cycle, the longest delay time produced in the two dummy signal processing portions.

A fourth aspect of the present invention is directed to the internal clock generator, wherein the dummy signal processing portion is a circuit which is formed by duplicating the path composed of the combinational circuit.

A fifth aspect of the present invention is directed to the internal clock generator, wherein the dummy signal processing portion is formed by using the same element as an element used for forming the path composed of the combinational circuit.

A sixth aspect of the present invention is directed to the internal clock generator, wherein the dummy signal processing portion includes a logic gate portion formed by only a plurality of transistors, and a load which is connected to the logic gate portion in series and has a capacitance or a resistance, or the combination thereof, and wherein the number of the transistors of the logic gate portion and the kind of the load are set such that a delay time produced in the dummy signal processing portion is changed in the same manner as the change of a delay time produced on the path composed of the combinational circuit according to the influences of process conditions and the ambient environment conditions such as a temperature.

According to the first aspect of the present invention, the delay time of the dummy signal processing portion is also changed so that the cycle of the clock is changed in accordance with the change of the delay time of the path by the ambient environment and the like. Consequently, it is possible to obtain an effect that the difference between the delay time of the combinational circuit and the cycle of the clock can be reduced.

According to the second aspect of the present invention, the longest delay time is set to the cycle of the clock. Consequently, it is possible to obtain an effect that the malfunction of the self-timed circuit can be prevented from occurring due to the cycle of the clock by various conditions such as the ambient environment and the like.

According to the third aspect of the present invention, even if the combinational circuit is changed in accordance with the change of the input from the "H" level to the "L" level or from the "L" level to the "H" level, either the delay time of the dummy delay signal processing portion including the first inverter or that of the dummy delay signal processing portion including the second inverter is always the longest delay time. Accordingly, even if the input is changed, the clock generating means always generates a clock including the longer delay time. Consequently, it is possible to generate a clock having a cycle which is exactly twice as much as the delay time and a duty ratio of 50%. In addition, the malfunction of the self-timed circuit can be prevented. Thus, the circuit can be caused to operate efficiently.

According to the fourth aspect of the present invention, a circuit which is formed by duplicating the combinational circuit is used. Consequently, the delay time of the path included in the self-timed circuit and that of the dummy signal processing portion are changed in the same manner according to the conditions such as the ambient environment and the like.

According to the fifth aspect of the present invention, the dummy signal processing portion is formed by using an element through which a signal to be processed passes. Consequently, it is possible to obtain an effect that the circuit area and consumed power of the dummy signal processing portion can be reduced.

According to the sixth aspect of the present invention, the dummy signal processing portion is formed by using the element including the logic gate portion and the load which is set so as to imitate the change of the delay time of the path. Consequently, it is possible to obtain an effect that the circuit area and consumed power of the dummy signal processing portion can be reduced.

In order to solve the above-mentioned problems, it is an object of the present invention to provide an internal clock generator for generating a clock having a short operating margin.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
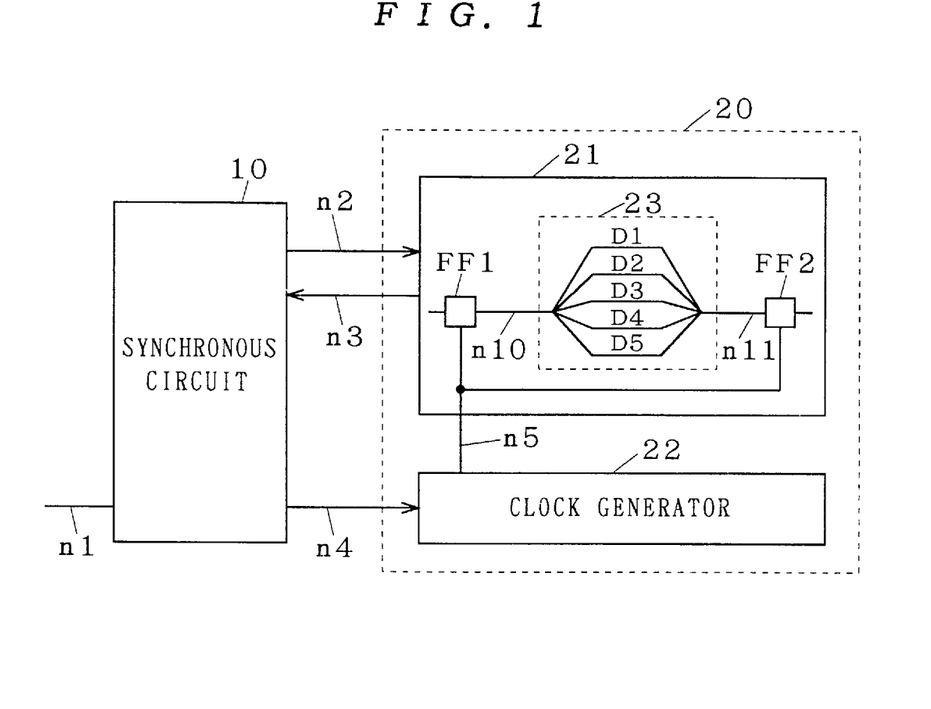
FIG. 1 is a block diagram showing the whole structure of a circuit to which an internal clock generator according to the present invention is applied.

FIG. 1 is a block diagram showing the whole structure of an apparatus to which an internal clock generator (a clock generator) according to the present invention is applied. In FIG. 1, the reference numeral 10 denotes a synchronous circuit, the reference numeral 20 denotes a self-timed apparatus, the reference numeral 21 denotes a self-timed apparatus body, the reference numeral 22 denotes a clock generator, the reference numeral 23 denotes a combinational circuit for processing a signal to be processed in the self-timed apparatus body 21, FF1 denotes a flip-flop circuit connected to the input of the combinational circuit 23, FF2 denotes a flip-flop circuit connected to the output of the combinational circuit 23, n1 denotes a node to which a clock to be inputted to the synchronous circuit 10 is applied, n4 denotes a node to which an enable signal generated by the synchronous circuit 10 and inputted to the clock generator 22 is applied, n2 denotes a node to which data outputted from the synchronous circuit 10 and inputted to the self-timed apparatus body 21 are applied, n3 denotes a node to which data outputted from the self-timed apparatus body 21 and inputted to the synchronous circuit 10 are applied, and n5 denotes a node to which a clock generated by the clock generator 22 and inputted to the self-timed apparatus body 21 is applied.

An example of the self-timed apparatus 20 is an information processor such as an arithmetic circuit. The self-timed apparatus 20 comprises the clock generator 22 for generating a clock, and the self-timed apparatus body 21 for processing a signal based on the clock.

The flip-flop circuit FF1 latches a signal according to the clock, and outputs the signal to a first specific node n10 in the self-timed apparatus body 21. The flip-flop circuit FF2 latches a signal on a second specific node n11 in the self-timed apparatus body 21 according to the clock. The combinational circuit 23 is provided between the first and second nodes n10 and n11. In the combinational circuit 23, only paths (critical paths) D1, D2, D3, D4 and D5 have the maximum processing times produced on the different ambient environment conditions, respectively. The paths D1 to D5 are formed by the combinational circuit respectively, and serve to process signals to be processed. An example of the ambient environment is an ambient temperature or the like.

Figure 2:
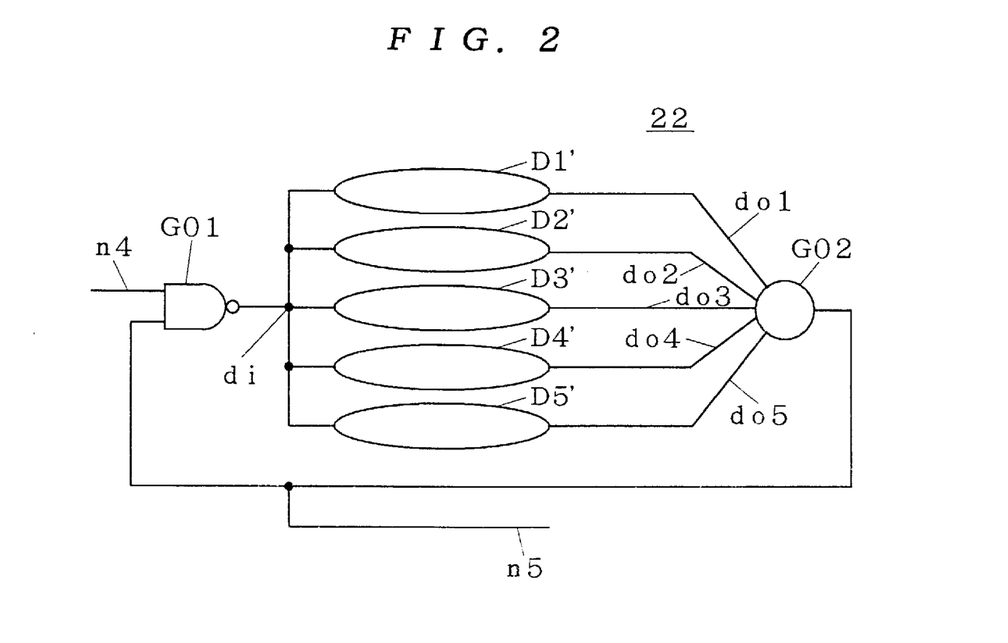
FIG. 2 is a circuit diagram showing an internal clock generator according to a first embodiment of the present invention.

FIG. 2 is a circuit diagram showing an internal clock generator according to a first embodiment of the present invention. In FIG. 2, G01 denotes a clock control circuit which is a NAND circuit, G02 denotes a Muller C-element, Dn' (n is an integer of 1 to 5) denotes a dummy signal processing portion which corresponds to a path Dn shown in FIG. 1, di denotes a node of the input of the dummy signal processing portion Dn', don (n is an integer of 1 to 5) denotes a node of the output of the dummy signal processing portion Dn', and other designations correspond to the designations in FIG. 1.

The structure of the internal clock generator shown in FIG. 2 will be described below. The clock control circuit G01 has one of inputs connected to the node n4, and the other input connected to the node n5. The output of the clock control circuit G01 is connected to all inputs of the dummy signal processing portion Dn'. The inputs of the Muller C-element G02 are connected to the outputs of the dummy signal processing portions Dn'. The output of the Muller C-element G02 is connected to the node n5. An internal clock is generated by a loop comprising the clock control circuit G01, the dummy signal processing portions Dn' and the Muller C-element G02. Therefore, clock generating means for generating an internal clock is the loop, that is, the clock generator 22 itself.

The dummy signal processing portions Dn' correspond to the paths Dn, respectively. In the present embodiment, the dummy signal processing portions Dn' are circuits which are formed by duplicating the paths Dn, respectively.

Figure 3:
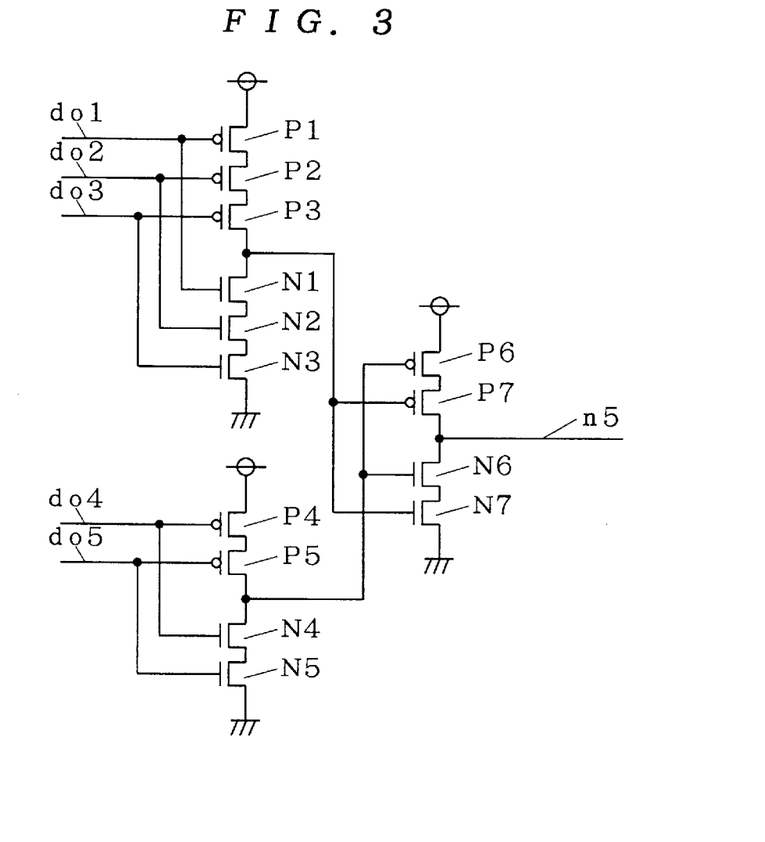
FIG. 3 is a circuit diagram showing an example of the internal structure of a Muller C-element G02.

As the Muller C-element G02 is used an element in which an output is changed from the "H" level to the "L" level or from the "L" level to the "H" level when all inputs are set to the same level. FIG. 3 shows an example of the internal structure of the Muller C-element G02. In FIG. 3, Pm (m is an integer of 1 to 7) denotes a p-channel MOS transistor, Nm (m is an integer of 1 to 7) denotes an n-channel MOS transistor, and other designations correspond to the designations in FIG. 1.

The operation of the internal clock generator shown in FIG. 2 will be described below with reference to a timing chart of FIG. 20. Tdn and Tdp in FIG. 20 are changed to Tdn' and Tdp', respectively. The clock control circuit G01 has the same delay time in the cases where an input signal is changed from the "H" level to the "L" level, and from the "L" level to the "H" level. The clock control circuit G01 has a delay time Tde. A circuit shown in FIG. 3 is used as the Muller C-element G02. The delay time between the input and output of the Muller C-element G02 always has a constant value Tdc. First of all, an enable signal on the node n4 is changed from the "L" level to the "H" level. Then, a signal on the node di is changed from the "H" level to the "L" level after the delay time Tde of the clock control circuit G01. Thereafter, signals on nodes do1 to do5 are changed from the "H" level to the "L" level after the delay of each dummy signal processing portion Dn'. When the signals on all the nodes do1 to do5 are set to the "L" level, a signal on the node n5 is changed from the "H" level to the "L" level. A delay time required between the change of the signal on the node di from the "H" level to the "L" level and that of the signal on the node n5 from the "H" level to the "L" level is represented by Tdn'.

Subsequently, the signal on the node di is changed from the "L" level to the "H" level after the delay time Tde of the clock control circuit G01. Thereafter, the signals on the nodes do1 to do5 are changed from the "L" level to the "H" level after the delay of each dummy signal processing portion Dn'. When the signals on all the nodes do1 to do5 are set to the "H" level, the signal on the node n5 is changed from the "L" level to the "H" level. A delay time required between the change of the signal on the node di from the "L" level to' the "H" level and that of the signal on the node n5 from the "L" level to the "H" level is represented by Tdp'. Then, the signal on the node di is changed from the "H" level to the "L" level again after the delay time Tde of the clock control circuit G01.

A time width TdL for a Low period of a clock on the node n5 is the sum of the delay times Tdp' and Tde. The delay time Tdp' is the sum of a maximum value Tdpmax of the delay times of the dummy signal processing portions Dn' and a delay time Tdc. A time width TdH for a High period of the clock on the node n5 is the sum of the delay times Tdn' and Tde. The delay time Tdn' is the sum of a maximum value Tdnmax of the delay times of the dummy signal processing portions Dn' and the delay time Tdc.

By repeating the above-mentioned operation, an internal clock is generated on the node n5. The signal on the node n5 becomes a clock having a cycle which is the sum of the time width TdH for the High period and the time width TdL for the Low period. In the case where the enable signal on the node n4 has the "L" level, the signals on the nodes di and n5 are fixed.

The operation of the circuit shown in FIG. 1 will be described below. The synchronous circuit 10 operates with a clock on the node n1 which is generated on the outside. The self-timed apparatus 20 (excluding the clock generator 22) operates with a clock on the node n5 which is generated on the inside.

The synchronous circuit 10 outputs data to the node n2, and an enable signal to the node n4. In addition, the synchronous circuit 10 fetches data on the node n3.

The clock generator 22 does not output and outputs a clock to the node n5 depending on the enable signal on the node n4. The self-timed apparatus body 21 generates data according to the clock on the node n5, and outputs the data to the node n3. In addition, the self-timed apparatus body 21 fetches data on the node n2.

The flip-flop circuit FF1 fetches a signal according to an effective edge 1 of the clock on the node n5, and outputs the signal to the combinational circuit 23. The combinational circuit 23 outputs a signal to the flip-flop circuit FF2 after a delay time passes since the signal outputted from the flip-flop circuit FF1 has been changed. The flip-flop circuit FF2 fetches the signal outputted from the combinational circuit 23 according to an effective edge 2 of the clock on the node n5. Accordingly, the effective edge 2 of the clock on the node n5 should not reach the flip-flop circuit FF2 before the delay time of the combinational circuit 23 passes. When the effective edge 2 of the clock reaches the flip-flop circuit FF2 before the delay time of the combinational circuit 23 passes, the self-timed apparatus body 21 malfunctions.

The above-mentioned delay time of the combinational circuit 23 is equal to a maximum value of the delay times between the inputs and outputs of the paths D1 to D5. As described above, the clock generator 22 generates a clock having a cycle which includes at least a maximum value of the delay times of the dummy signal processing portions D1' to D5' corresponding to the paths D1 to D5, respectively. The maximum value of the delay times of the paths Dn is equal to that of the delay times of the dummy signal processing portions Dn'.

According to the present embodiment, the delay time of the dummy signal processing portion Dn' is also changed so that the cycle of the clock is changed in accordance with the change of the delay time of the path Dn by the ambient environment and the like. Consequently, the malfunction of the self-timed apparatus 20 can be prevented because the period for the effective edges 1 and 2 is always longer than the processing time. It is not necessary to insert the delay element according to the prior art into the clock generator 22. Consequently, an operating margin can be reduced as much as possible and the time for processing a signal can be shortened. Furthermore, the dummy signal processing portions Dn' are circuits which are formed by duplicating the paths Dn, respectively. Consequently, the delay time of the path included in a self-timed circuit and that of the dummy signal processing portion are changed in the same manner according to the conditions such as the ambient environment and the like.

In the case where the process conditions and a variation in manufacture are taken into consideration, it is necessary to manufacture the dummy signal processing portion Dn' and the combinational circuit 23 on the same process conditions. In the case where the ambient environment conditions such as a temperature are taken into consideration, it is necessary to hold the dummy signal processing portion Dn' and the combinational circuit 23 in the same environment. One of preferred forms which meet these requirements is a structure in which the clock generator 22 and the combinational circuit 23 are formed on one chip. Thus, a variation in manufacture and the ambient environment conditions are taken into consideration so that it is possible to obtain the self-timed apparatus which is rarely influenced by these conditions.

Second Embodiment

Figure 4:
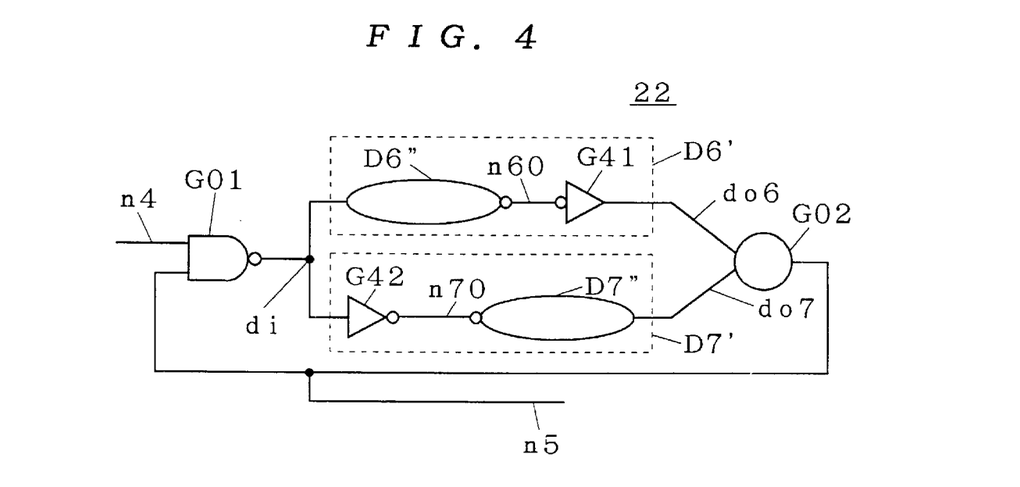
FIG. 4 is a circuit diagram showing an internal clock generator according to a second embodiment of the present invention.

FIG. 4 is a circuit diagram showing an internal clock generator according to a second embodiment of the present invention. In FIG. 4, D6' and D7' denote dummy signal processing portions, D6" and D7" denote dummy signal processing portion bodies, G41 and G42 denote inverters, and other designations correspond to the designations in FIG. 2.

The structure of the internal clock generator shown in FIG. 4 will be described below. The output of a clock control circuit G01 is connected to the input of the dummy signal processing portion body D6" and that of the inverter G42. The output of the dummy signal processing portion body D6" is connected to the input of the inverter G41. The output of the inverter G42 is connected to the input of the dummy signal processing portion body D7". The inputs of a Muller C-element G02 are connected to the output of the inverter G41 and that of the dummy signal processing portion body D7". The dummy signal processing portion bodies D6" and D7" have the same circuit structure. The inverters G41 and G42 have the same circuit structure. Other structures are the same as the, structure of the internal clock generator shown in FIG. 2. The dummy signal processing portion body D6" and the inverter G41 form the dummy signal processing portion D6'. The dummy signal processing portion body D7" and the inverter G42 form the dummy signal processing portion D7'. An internal clock is generated by a loop comprising the clock control circuit G01, the dummy signal processing portions D6' and D7', and the Muller C-element G02. For this reason, clock generating means for generating an internal clock is the loop, that is, the clock generator 22 itself.

The dummy signal processing portion bodies D6" and D7" correspond to one of the paths Dn shown in FIG. 1. In the present embodiment, the dummy signal processing portion body D6" is formed by duplicating one of the paths Dn. Similarly, the dummy signal processing portion body D7" is formed by duplicating one of the paths Dn separately.

Figure 5:
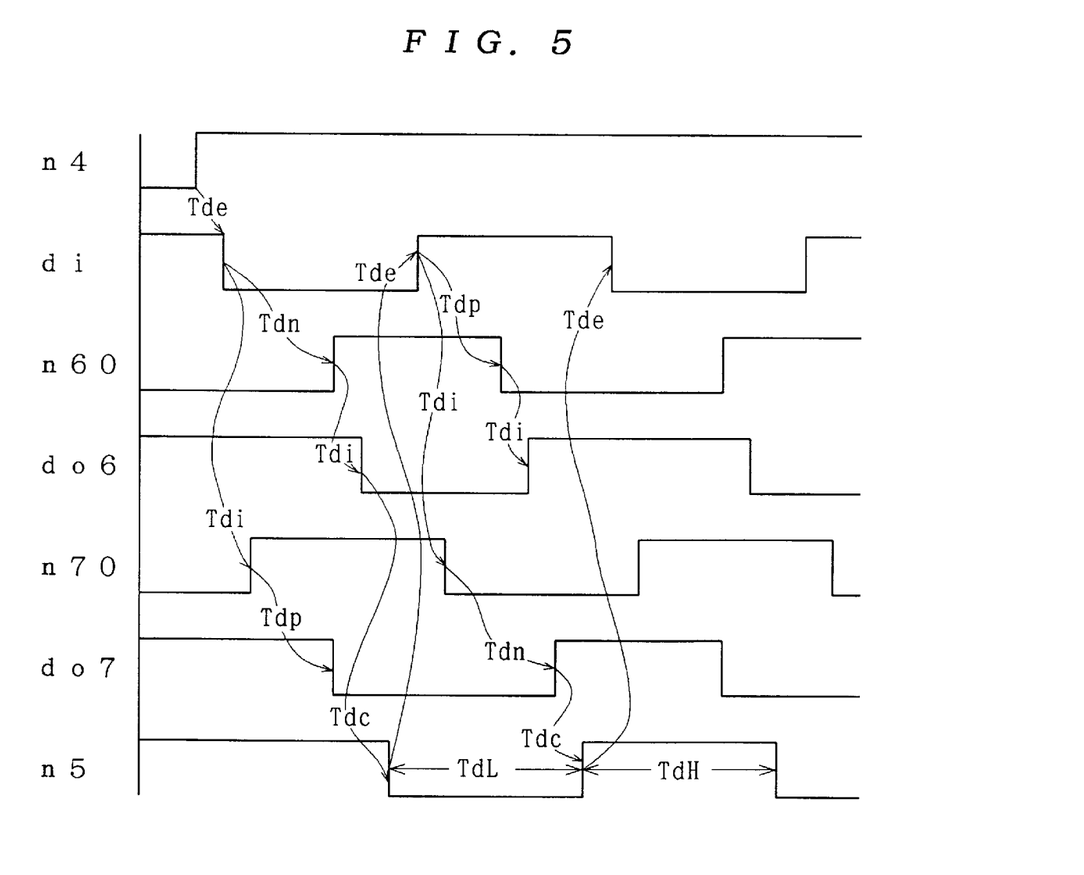
FIG. 5 is a timing chart for each signal on each node of the internal clock generator shown in FIG. 4.

The operation of the internal clock generator shown in FIG. 4 will be described below with reference to a timing chart of FIG. 5. The clock control circuit G01 has the same delay time in the cases where an input signal is changed from the "H" level to the "L" level, and from the "L" level to the "H" level. The clock control circuit G01 has a delay time Tde. The circuit shown in FIG. 3 is used as the Muller C-element G02. The delay time between the input and output of the Muller C-element G02 always has a constant value Tdc. The inverters G41 and G42 have the same delay time in the cases where an input signal is changed from the "H" level to the "L" level, and from the "L" level to the "H" level. The inverters G41 and G42 have a delay time Tdi. In the case where the input signal is changed from the "H" level to the "L" level, the dummy signal processing portion bodies D6" and D7" have a delay time Tdn. In the case where the input signal is changed from the "L" level to the "H" level, the dummy signal processing portion bodies D6" and D7" have a delay time Tdp. The delay time Tdn is longer than the delay time Tdp.

First of all, an enable signal on a node n4 is changed from the "L" level to the "H" level. Then, a signal on a node di is changed from the "H" level to the "L" level after the delay time Tde of the clock control circuit G01.

The signal on the node di is changed from the "H" level to the "L" level. Then, a signal on a node n60 is changed from the "L" level to the "H" level after the delay time Tdn of the dummy signal processing portion body D6". Thereafter, a signal on a node do6 is changed from the "H" level to the "L" level after the delay time Tdi of the inverter G41. A signal on a node n70 is changed from the "L" level to the "H" level after the delay time Tdi of the inverter G42. Then, a signal on a node do7 is changed from the "H" level to the "L" level after the delay time Tdp of the dummy signal processing portion body D7". After the signal on the node do7 is changed from the "H" level to the "L" level, the signal on the node do6 is changed from the "H" level to the "L" level. Thereafter, a signal on a node n5 is changed from the "H" level to the "L" level after the delay time Tdc of the Muller C-element G02.

The signal on the node n5 is changed from the "H" level to the "L" level Then, the signal on the node di is changed from the "L" level to the "H" level after the delay time Tde of the clock control circuit G01. Thereafter, the signal on the node n60 is changed from the "H" level to the "L" level after the delay time Tdp of the dummy signal processing portion body D6". Subsequently, the signal on the node do6 is changed from the "L" level to the "H" level after the delay time Tdi of the inverter G41. Then, the signal on the node n70 is changed from the "H" level to the "L" level after the delay time Tdi of the inverter G42. Thereafter, the signal on the node do7 is changed from the "L" level to the "H" level after the delay time Tdn of the dummy signal processing portion body D7". After the signal on the node do6 is changed from the "L" level to the "H" level, the signal on the node do7 is changed from the "L" level to the "H" level. Thereafter, the signal on the node n5 is changed from the "L" level to the "H" level after the delay time Tdc of the Muller C-element G02.

By repeating the above-mentioned operation, a clock is generated on the node n5. The signal on the node n5 becomes a clock having a cycle which is the sum of a time width TdH for a High period and a time width TdL for a Low period. In the case where an enable signal on the node n4 has the "L" level, the signals on the nodes di and n5 are fixed.

As described above, if the delay time Tdn is longer than the delay time Tdp, each of the time widths TdL and TdH for the Low and High periods of the clock on the node n5 is the sum of the delay times Tde, Tdi, Tdn and Tdc. Similarly, if the delay time Tdp is longer than the delay time Tdn, each of the time widths TdL and TdH for the Low and High periods of the clock on the node n5 is the sum of the delay times Tde, Tdi, Tdp and Tdc.

The time width for the Low period of the clock is equal to the time width for the High period thereof. For this reason, the duty ratio of the clock (TdH/TdL) is 50%. Each of the time widths for the Low and High periods of the clock includes the longer delay time which is varied depending on the transition of the input signal. Accordingly, if the delay times Tde, Tdi and Tdc are ignored, it is possible to generate a clock having a cycle which is exactly twice as much as the longer delay time of the paths which is varied depending on the transition of the input signal.

According to the present embodiment, if the present invention is particularly applied to the self-timed apparatus body for processing a signal based on the timings of both edges, the self-timed apparatus body can be caused to operate efficiently. The reason is that the time widths for the Low and High periods include the longer delay times, respectively. Therefore, the signal can be processed between the effective edges. Accordingly, the malfunction of the self-timed apparatus can be prevented. Furthermore, the duty ratio is 50%. For this reason, it is not necessary to insert the delay element according to the prior art into the clock generator 22. Consequently, the operating margin can be reduced as much as possible and the time for processing the signal can be shortened.

Third Embodiment

In the first or second embodiment, the dummy signal processing portion has been formed by duplicating the path which is included in the combinational circuit 23. However, in the case where the duplicated path is used, the circuit area and consumed power of the clock generator 22 are large. The form to solve this problem will be described below.

Figure 6:
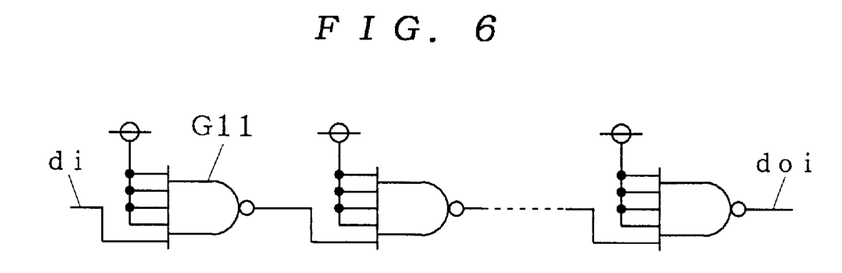
FIG. 6 is a circuit diagram showing an example of a dummy signal processing portion of an internal clock generator according to a third embodiment of the present invention.
Figure 7:
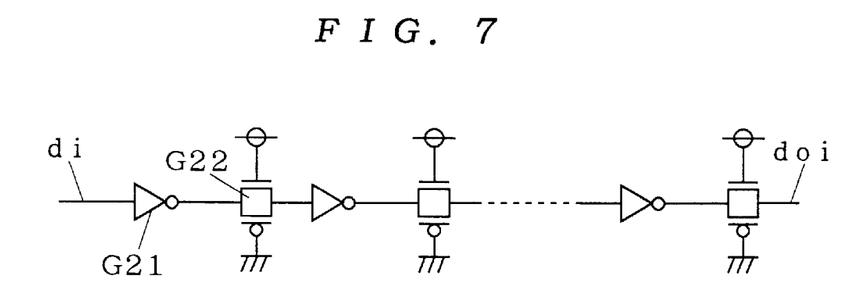
FIG. 7 is a circuit diagram showing an example of the dummy signal processing portion of the internal clock generator according to the third embodiment of the present invention.
Figure 8:
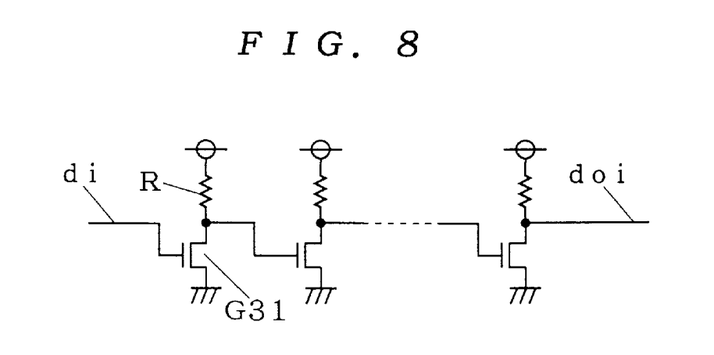
FIG. 8 is a circuit diagram showing an example of the dummy signal processing portion of the internal clock generator according to the third embodiment of the present invention.

FIGS. 6 to 8 are circuit diagrams showing examples of a dummy signal processing portion of an internal clock generator according to a third embodiment of the present invention. FIGS. 6 to 8 mainly show structures using a plurality of elements to which a logic gate, a transfer gate and a transistor unit are connected (hereinafter referred to as a "gate chain"). FIG. 6 shows a dummy signal processing portion corresponding to a signal processing portion in which a plurality of logic gates G11 are connected in series. FIG. 7 shows a dummy signal processing portion corresponding to a signal processing portion in which a plurality of transfer gates G22 are connected. FIG. 8 shows a dummy signal processing portion corresponding to a signal processing portion in which a plurality of resistance load type NMOS logic gates G31 are connected. In FIG. 7, G21 denotes an inverter. In FIG. 8, R denotes a resistor. Other designations in FIGS. 6 to 8 correspond to the designations in FIG. 2.

The dummy signal processing portions shown in FIGS. 6 to 8 have the following structure. An element which is applied to the gate chain is the same as an element which is used on a path Dn and through which a signal to be processed passes. A delay time between the input and output of the gate chain from a node di to a node doi is set equal to a delay time between the input and output of the path Dn. By forming the dummy signal processing portion as described above, the influences of a fluctuation in supply voltage, process conditions, and the ambient environment conditions such as a temperature which are similar to those of the path Dn can be imnitated.

Figure 9:
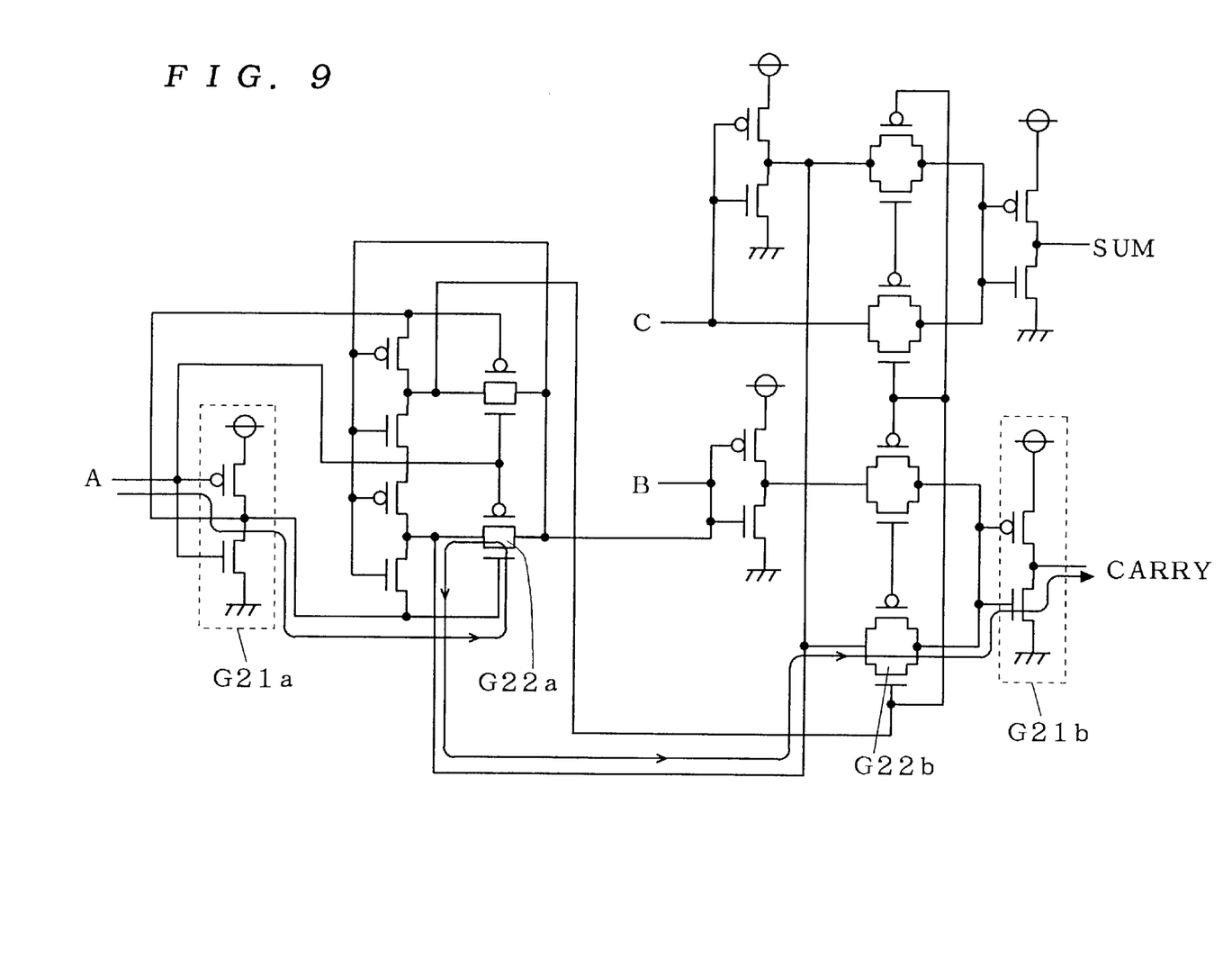
FIG. 9 is a circuit diagram showing an example of a full adder circuit.

As an example, the dummy signal processing portion shown in FIG. 7 will be described below. For example, it is assumed that a self-timed multiplier is designed. The multiplier includes a multiplication array portion for performing multiplication. Most of the critical paths of the multiplication array portion are occupied by a full adder circuit. FIG. 9 is a circuit diagram showing an example of the full adder circuit. In FIG. 9, A, B and C denote inputs, and SUM and CARRY denote outputs. As shown in FIG. 9, the full adder circuit is formed by using a circuit having pass-transistors G22a, G22b and the like. A circuit having the pass-transistors is commonly seen in a data path element circuit such as the full adder circuit. One of candidates for the critical path of the full adder circuit shown in FIG. 9 is a path shown by an arrow in FIG. 9. The path shown by the arrow passes through inverters G21a and G21b and the pass-transistors G22a and G22b. The dummy signal processing portion shown in FIG. 7 has a path which passes through a plurality of inverters G21 corresponding to the inverters G21a and G21b and a plurality of transfer gates G22 corresponding to the pass-transistors G22a and G22b. Accordingly, the path shown by the arrow in FIG. 9 and the dummy signal processing portion shown in FIG. 7 have different input conditions to a gate; parasitic capacitances and the like, but are of the same kind in respect of the features of a circuit. For this reason, the change of a delay value for a fluctuation in supply voltage or the like is similar. As described above, most of the critical paths of the multiplication array portion are occupied by the full adder circuit. Consequently, most of the fluctuation in the delay value of the critical path of the multiplication array portion can be imitated by the dummy signal processing portion shown in FIG. 7.

According to the present embodiment, the dummy signal processing portion is formed by using the same gate as that used on the path Dn. Consequently, it is possible to obtain the dummy signal processing portion which imitates the influences of the process conditions and the ambient environment conditions such as a temperature that are similar to those of the path Dn, and has smaller circuit area and consumed power.

Fourth Embodiment

In the first or second embodiment, the dummy signal processing portion has been formed by duplicating the path which is included in the combinational circuit 23. However, in the case where the duplicated path is used, the circuit area and consumed power of the clock generator 22 are large. Another form than in the third embodiment to solve this problem will be described below.

Figure 10:
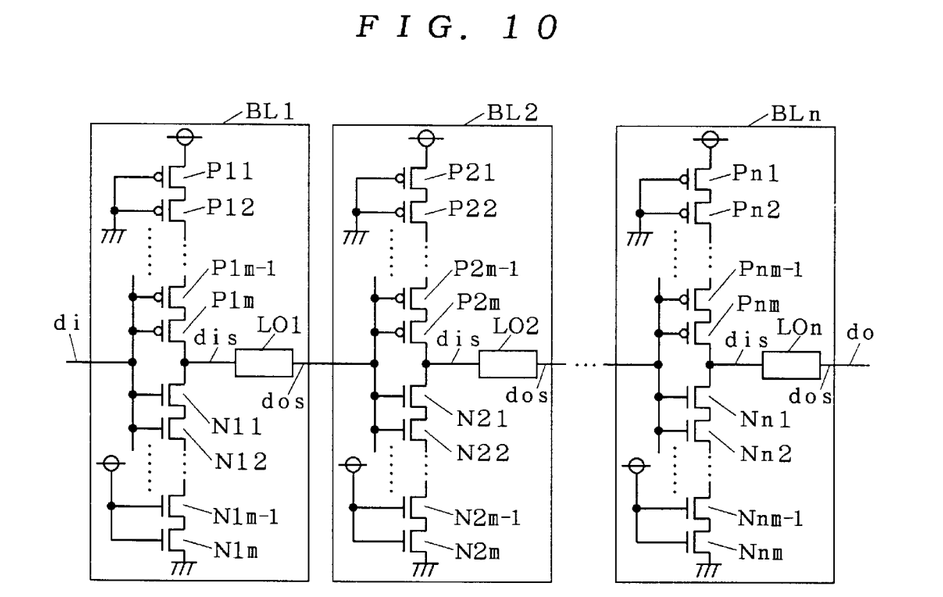
FIG. 10 is a circuit diagram showing a dummy signal processing portion of an internal clock generator according to a fourth embodiment of the present invention.

FIG. 10 is a circuit diagram showing a dummy signal processing portion of an internal clock generator according to a fourth embodiment of the present invention. The dummy signal processing portion shown in FIG. 10 comprises a plurality of blocks BLi (i=1 to n). Each of the circuit blocks BLi includes a logic gate portion and a load LOi. The logic gate portion has a p-channel MOS transistor Pij (j=1 to m) and an n-channel MOS transistor Nij. The load LOi has a capacitance and a resistance, or the combination thereof. A node dis is one of ends on the node di side of the load LOi. A node dos is the other end on the node do side of the load LOi. Other designations in FIG. 10 correspond to the designations in FIG. 2.

The dummy signal processing portion shown in FIG. 10 has the following structure. The number of the transistors of the logic gate portion and that of the circuit blocks are decided at the time of design, and a delay time between the input and output of a gate chain from a node di to a node doi is set equal to a delay time between the input and output of a path Dn. To the loads LO1 to LOn is set a load corresponding to the load in the path Dn which influences the delay time on receipt of the influences of various conditions, for example, process conditions, a variation in manufacture, the ambient environment such as an ambient temperature, the transition of an input signal and the like. By forming the dummy signal processing portion as described above, the influences of the process conditions and the ambient environment conditions such as a temperature that are similar to those of the path Dn can be imitated.

Figure 11:
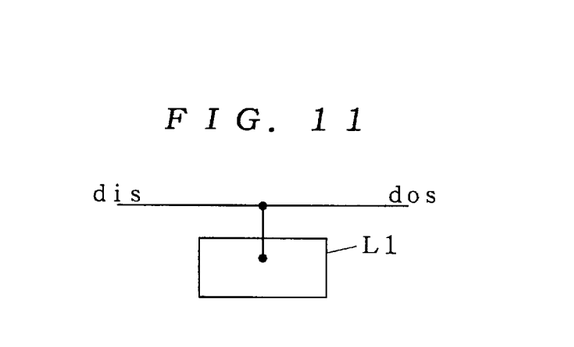
FIG. 11 is a schematic layout showing an example of a load LOi.
Figure 12:
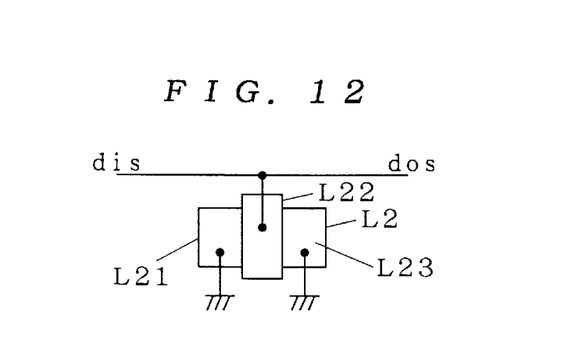
FIG. 12 is a schematic layout showing an example of the load LOi.
Figure 13:
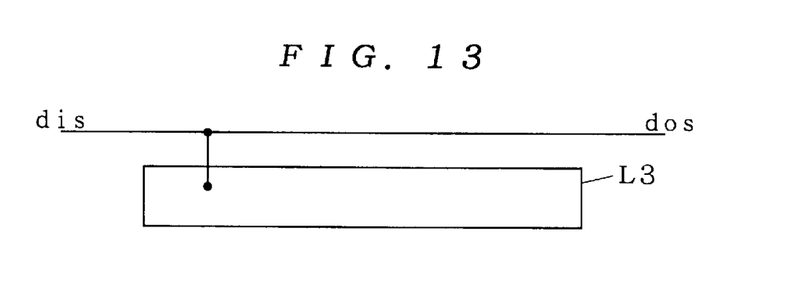
FIG. 13 is a schematic layout showing an example of the load LOi.
Figure 14:
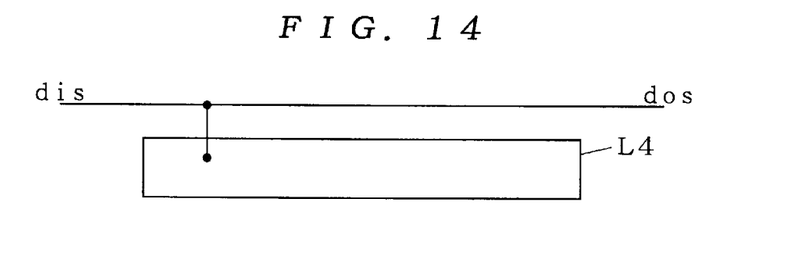
FIG. 14 is a schematic layout showing an example of the load LOi.

FIGS. 11 to 18 are schematic layouts showing examples of the load LOi. FIG. 11 shows a load having a diffusion capacitance in which an n-channel diffusion region L1, a node dis and a node dos are electrically connected to one another, for example. FIG. 12 shows a load having the gate capacitance of a transistor in which a gate electrode L22 of an n-channel MOS transistor L2, a node dis and a node dos are electrically connected to one another, and a source L21 and a drain L23 are connected to a ground, for example. FIG. 13 shows a load having the interconnection capacitance of a semiconductor in which a polycrystalline silicon interconnection L3, a node dis and a node dos are electrically connected to one another, for example. FIG. 14 shows a load having the interconnection capacitance of a metal in which a metallic interconnection L4, a node dis and a node dos are electrically connected to one another, for example.

Figure 15:
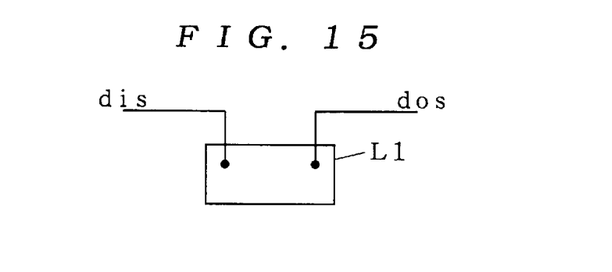
FIG. 15 is a schematic layout showing an example of the load LOi.
Figure 16:
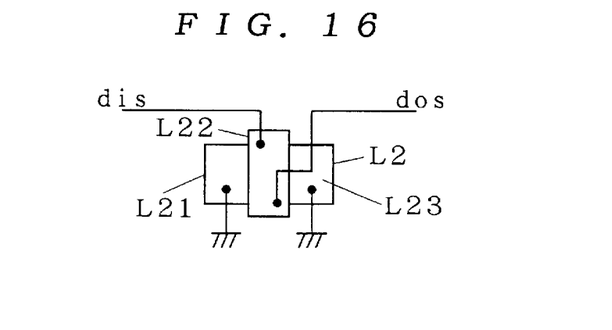
FIG. 16 is a schematic layout showing an example of the load LOi.
Figure 17:
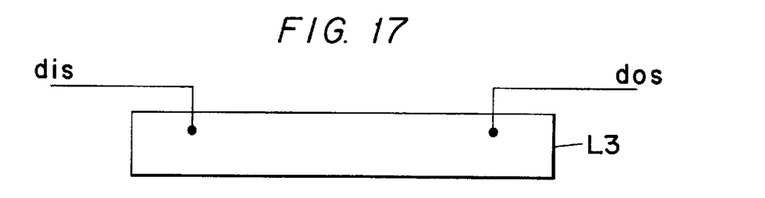
FIG. 17 is a schematic layout showing an example of the load LOi.
Figure 18:
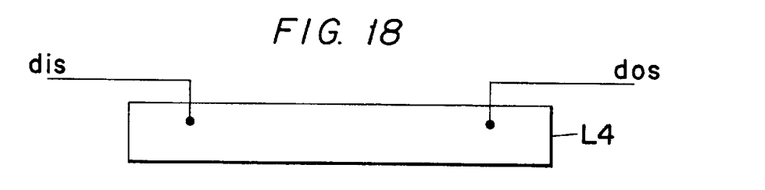
FIG. 18 is a schematic layout showing an example of the load LOi.

FIG. 15 shows a load having the diffusion resistance and capacitance in which one of ends of an n-channel diffusion region L1 is electrically connected to a node dis, and the other end of the n-channel diffusion region L1 is electrically connected to a node dos, for example. FIG. 16 shows a load having the gate resistance and capacitance of a transistor in which one of ends of a gate electrode L22 of an n-channel MOS transistor L2 is electrically connected to a node dis, and the other end of the gate electrode L22 of the n-channel MOS transistor L2 is electrically connected to a node dos, and a source L21 and a drain L23 are electrically connected to a ground, for example. FIG. 17 shows a load having the interconnection resistance and capacitance of a semiconductor in which one of ends of a polycrystalline silicon interconnection L3 is electrically connected to a node dis and the other end of the polycrystalline silicon interconnection L3 is electrically connected to a node dos, for example. FIG. 18 shows a load having the interconnection resistance and capacitance of a metal in which one of ends of a metallic interconnection L4 is electrically connected to a node dis and the other end of the metallic interconnection L4 is electrically connected to a node dos, for example.

According to the present embodiment, a plurality of circuit blocks comprising the logic gate portions and the loads LOi are connected in series. Consequently, it is possible to obtain a dummy signal processing portion in which the influences of the process conditions and the ambient environment conditions such as a temperature that are similar to those of the path Dn are imitated, and has smaller circuit area and consumed power.

Some of the dummy signal processing portions according to the first embodiment may include the dummy signal processing portion according to the second embodiment. Furthermore, some of the dummy signal processing portions according to the first embodiment may include the dummy signal processing portion which is obtained by applying the third or fourth embodiment to the dummy signal processing portion body according to the second embodiment.

While the invention has been described in detail, the foregoing description is in all aspects illustrative and not restrictive. It is understood that numerous other modifications and variations can be devised without departing from the scope of the invention.

I claim:

1. A self-timed-apparatus comprising:
    an internal clock generator for generating an internal clock for said self-timed apparatus;
    a combinational circuit having a signal processing path connected with said internal clock generator;
    said internal clock generator comprising:
        clock generating means for generating the internal clock, said clock generating means including
        a path corresponding to the signal processing path, and
        a dummy signal processing portion connected within said corresponding path, wherein a cycle of the generated internal clock includes a delay time produced in said dummy signal processing portion, said delay time corresponding to a delay produced in said combinational circuit of the self-timed circuit.

2. The self-timed apparatus as defined in claim 1, wherein the combinational circuit includes a plurality of signal processing paths;
    said clock generating means includes a plurality of dummy signal processing portions corresponding to said plurality of signal processing paths; and
    said cycle includes the longest delay time produced in said dummy signal processing portions.

3. The self-timed apparatus as defined in claim 1, wherein said corresponding path has an input and an output and two dummy signal processing portions are provided on said corresponding path each connected to said input and output,
    one of said two dummy signal processing portions includes a first inverter connected to said input,
    the other dummy signal processing portion includes a second inverter connected to said output, and
    said cycle includes the longest delay time produced in said two dummy signal processing portions.

4. The self-timed apparatus as defined in claim 1, wherein said dummy signal processing portion is a circuit duplicating said signal processing path of said combinational circuit.

5. The self-timed apparatus as defined in claim 1, wherein said dummy signal processing portion comprises a same element as an element forming said signal processing path of said combinational circuit.

6. The self-timed apparatus as defined in claim 1, wherein said dummy signal processing portion includes:
    a logic gate portion consisting of only a plurality of transistors; and
    a load which is connected to said logic gate portion in series having a capacitance or a resistance, or the combination thereof, and
    wherein the number of said transistors of said logic gate portion and said load produce a delay time in said dummy processing portion that changes in the same manner as a change of a delay time produced on said signal processing path of said combinational circuit resulting from influences of process conditions and ambient environment conditions.

7. A self-timed apparatus comprising:
    an internal clock generator for said self-timed apparatus
    a combinational circuit connected with said internal clock generator and including a plurality of paths, one of said plurality of paths is a critical path,
    the internal clock generator comprising:
        a clock control circuit;
        a plurality of dummy signal processing portions coupled to said clock control circuit; and
        an output clock portion coupled to said plurality of dummy signal processing portions for outputting a generated clock which includes a cycle including the maximum value of a plurality of delays corresponding to said plurality of dummy signal processing portions, wherein said cycle is increased or decreased, accordingly, if a delay time of the critical path of the combinational circuit is increased or decreased.

* * * * *